Sept. 12, 1961　　　A. G. BODINE, JR　　　2,999,540
SONIC HEATER FOR WELLS
Filed July 20, 1959　　　　　　　　　　　　　　　2 Sheets-Sheet 1
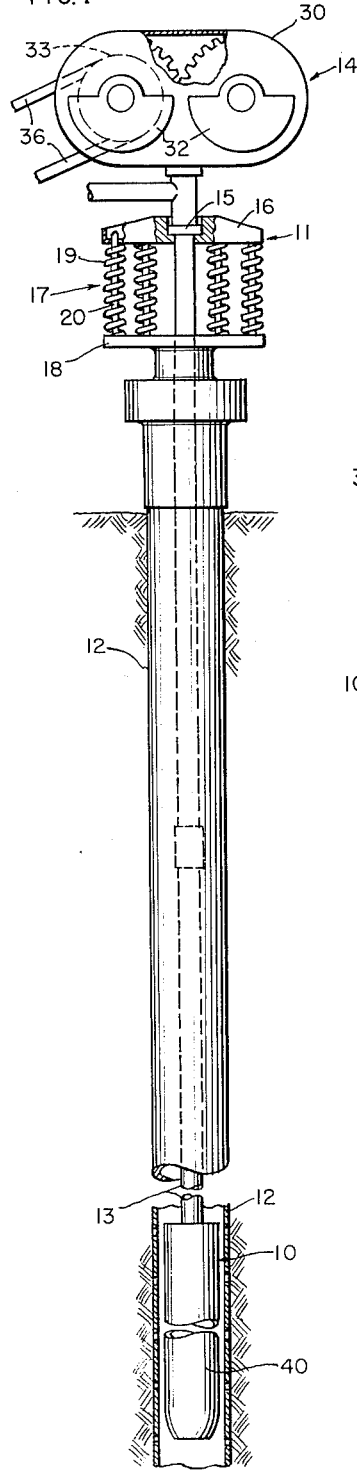
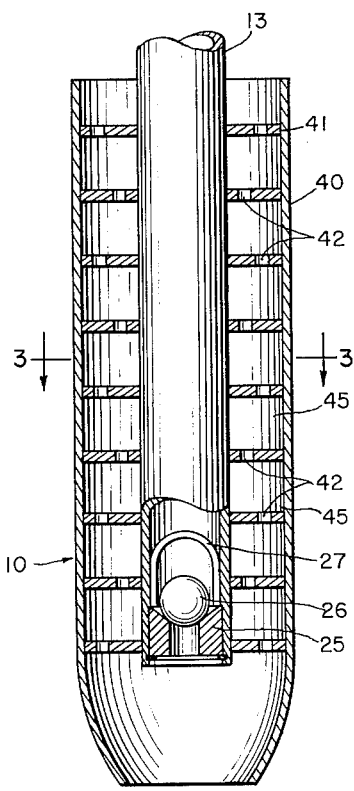
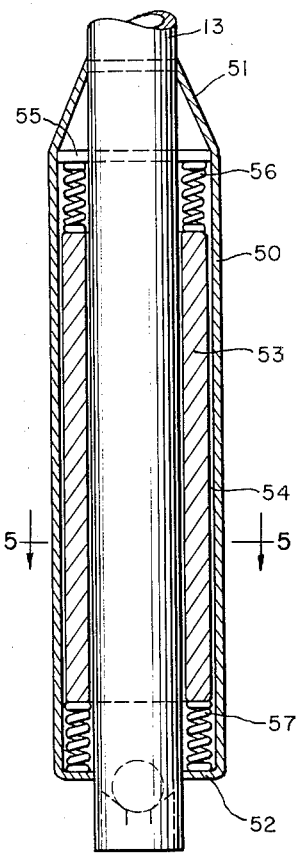
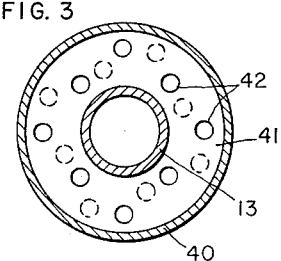
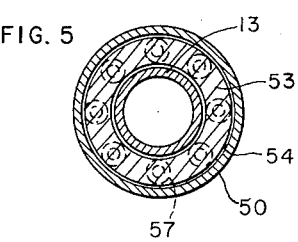
*INVENTOR.*
ALBERT G. BODINE JR.
BY
*Ernest J. Lilley*
ATTORNEY Sept. 12, 1961     A. G. BODINE, JR     2,999,540
SONIC HEATER FOR WELLS Filed July 20, 1959     2 Sheets-Sheet 2

*INVENTOR.*
ALBERT G. BODINE JR.
BY
ATTORNEY

United States Patent Office 2,999,540
Patented Sept. 12, 1961

2,999,540
SONIC HEATER FOR WELLS
Albert G. Bodine, Jr., 13120 Moorpark St.,
Sherman Oaks, Calif.
Filed July 20, 1959, Ser. No. 828,340
18 Claims. (Cl. 166—39)

This invention relates generally to oil well heating for promoting flow of heavy crude oil, and more particularly to methods and means for heating the body of oil within the bottom of an oil well by conversion of sonic wave energy to heat energy.

Various prior methods of well heating are known, including various forms of electrical immersion heating, and use of steam pipes. These methods, their general purpose, and their limitations, are so well known that no discussion thereof will be necessary.

A general object of the present invention is the provision of a simpler and more reliable and effective method and apparatus for well heating using the principle of conversion of sonic wave energy to heat.

The present invention, speaking broadly, employs a sonic wave energy generator at the ground surface, an elastic column means for transmitting such energy to the producing formation or region at the bottom of the well and a converter at the bottom of the well for transforming the sonic wave energy to heat energy. The invention is not to be confused with prior systems for well flow augmentation wherein sonic wave energy is radiated into and transmitted through the oil producing formation by elastic wave motion. Such prior methods may have resulted in the incidental generation of some small amount of heat within the formation; but the aim in such case is maximum wave transmission into and through the formation, and any conversion of wave energy to heat energy before the wave has transmitted a substantial distance into the formation was only incidental, and to whatever extent it occurred, usually represented an unfavorable attenuation of the wave. No energy converter for transforming sonic wave energy to heat energy was used. The present invention, by contrast, employs a converter designed for transforming a large amount of sonic energy to an equivalent amount of heat energy. Such a converter may of course be used along with the previously known sound wave radiator, in which case the total available sonic energy is divided between the converter and the radiator. The invention will herein be described, however, in its typical use without a wave radiator, in which case all available sonic energy is converted into heat. In any case, the present invention is distinguished from the described prior art practices by by use of specific converter equipment for transforming sonic wave energy to heat energy, whereby a large amount of heat is dissipated in the well fluids within the well bore. The prior system radiated substantial sonic wave energy from the apparatus, in a manner to mechanically vibrate the formation; by contrast, the system of this invention radiates heat energy from the apparatus into the well fluids in the well bore.

Various forms of apparatus for carrying the invention into effect are possible, some of which are illustrated in the accompanying drawings, in which:

FIG. 1 is a view, partly in longitudinal section and partly in elevation, showing a sonic type pump equipped with a sonic well heater in accordance with the invention;

FIG. 2 is an enlarged view taken from FIG. 1 showing the sonic heater in longitudinal section;

FIG. 3 is a transverse section taken on line 3—3 of FIG. 2;

FIG. 4 is a view in longitudinal section of a modified sonic heater in accordance with the invention, showing the same mounted on the pump tubing of a sonic pump understood to be of the same type as illustrated in FIG. 1;

FIG. 5 is a transverse section taken on line 5—5 of FIG. 4;

Figure 6:
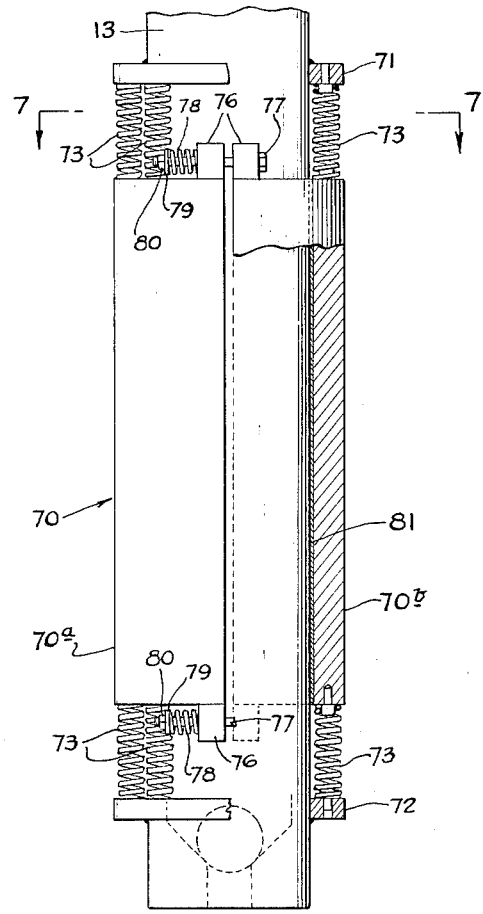
FIG. 6 shows another embodiment of the invention.

In FIGS. 1 and 2 I have shown an illustrative embodiment of sonic well heater 10 applied to a sonic pump 11 of the general type disclosed in my Patent No. 2,444,912, issued July 8, 1948, and entitled Method and Apparatus for Pumping. The well casing is indicated at 12, suitably perforated, as shown, opposite the producing formation, and an elastic steel pump tubing 13 is suspended therein, and has mounted on its upper end a sonic wave generator 14. Near its upper end, the tubing 13 is furnished with a collar 15 supported by the top plate 16 of a spring suspension device 17. Spaced below plate 16 is a bottom plate or platform 18 of this device supported by the upper end of casing 12, and between plates 16 and 18 are a plurality of coil springs 19 supporting the top plate 16 as well as the pump tubing 13 and sonic generator 14, vertical or positioning pins 20 set into platform 18 extending upwardly through the springs 19 and passing with working clearance through suitable bores in the top plate 16. The weight of the pump tubing 13 as well as that of sonic generator 14 is thus transferred to springs 19 and thence to casing 12 supported by the earth.

The lower end portion of pump tubing 13 (see FIG. 2) carries a seat ring 25 for a check valve ball 26, and at 27 is indicated a suitable cage for ball 26. There may be a plurality of similar check valve units spaced along with pump tubing 13, as described in my aforementioned patent.

Sonic wave generator 14 comprises a housing 30 containing a means for setting up vertically directed vibrations and thereby exerting a vertical oscillating force upon the upper end of the pump tubing. The means for generating these vibrations may be mechanical, electrical, hydraulic or any other type capable of delivering sufficient power. A type of generator well adapted for the purpose has meshing oppositely rotating gears 31 carrying eccentric weights 32 which balance out horizontal vibrations but cause vertical vibrations to be additive to produce a substantial oscillatory force in a vertical direction. A driving pulley 33 for the sonic wave generator is mounted on the shaft for one of the gears and unbalanced weights and is driven by an electric motor or any other suitable prime mover (not shown) through belt 36.

Generator 14 applies an oscillating force in a vertical direction to the upper end of the elastic pump tubing 13, thereby launching alternating elastic deformation waves of tension and compression down the pump tubing, these waves traveling in the tubing with the speed of sound. The pump tubing 13 is long relative to a quarter wavelength pattern measured along the column. It will be clear that the wave frequency is determined by the speed of the sound wave generator 14. For most efficient transmission of the sonic wave energy from the generator down the elastic pump tubing, the generator should be adjusted to a resonant frequency of the tubing, so as to establish a standing wave along the tubing, all as more fully described in my aforementioned Patent No. 2,444,-912.

In operation, the elastic waves of tension and compression transmitted down the pump tubing from the generator 14 cause the lower end portion of the tubing, and therefore the check valve seat ring 25, to be longitudinally reciprocated through a short displacement distance at the frequency of operation of the sonic wave generator 14. Each down stroke of seat ring 25 with said tubing occurs at an acceleration greater than gravity, and the check valve ball accordingly unseats during such time. Well fluids displaced by the downwardly traveling seat ring therefore flow up through the ring and fill the void above the ring caused by the down stroke of the latter. On the up stroke of the seat ring, the check valve ball seats and the column of fluid thereabove is elevated. This pumping action is more fully set forth in my aforementioned patent.

The sonic well heater 10 in the embodiment shown in FIGS. 1 and 2 comprises an annular shell 40 of considerable length, typically 20–30 feet, annularly spaced inside the well casing and surrounding and annularly spaced from the lower end portion of the pump tubing, as shown in FIG. 2. Perforated baffle rings 41 are spaced longitudinally along this shell 40, their outer peripheries being connected as by welding to the shell, and their inner peripheries being connected as by welding to the pump tubing 13. These rings are provided with fluid passing perforations or orifices 42, and as indicated in FIG. 2, these orifices are preferably offset or staggered from one ring to the next. It will be seen that the structure thus described provides a plurality of well fluid chambers 45, interconnected by staggered fluid orifices 42.

In the operation of the pump, the lower end portion of the tubing oscillates vertically through a short displacement distance owing to sonic wave energy transmitted down the tubing from the sonic wave generator 14, as described above. The sonic heater structure mounted on the lower end portion of the tubing accordingly participates in this vertical oscillation, with the result that the perforated rings 41 are alternately elevated and lowered, at the frequency of operation of the sonic wave generator, and with an acceleration exceeding that of gravity. The bodies of well fluids trapped within the successive interconnected chambers 45 are accordingly forced to flow alternately upwardly and downwardly through the orifices 42, with a great churning effect. Stated otherwise, and with more precision, the body of liquid within the shell is restrained, by reason of its inertia, against oscillatory movement with the shell, and passes from chamber to chamber through the baffle orifices as the baffles move against it. Because of the offset arrangement of the orifices in successive plates, the flow from chamber to chamber must take place in tortuous paths, and the orifices 42 are sufficiently constricted that substantial resistance to such flow is established, with consequent churning and turbulence. The result of this frictional resistance, churning and turbulence is a hydraulic "loss" in the form of frictional heating of the well fluids and the converter structure. Thus the heat generated within the well fluids in the chambers 45 heats the rings 14 and shell 40 to an elevated temperature, and the shell 40, in turn, heats the surrounding well fluids within the casing 12. The heat thence flows outwardly into the surrounding formation, lowering the viscosity of the well fluids and promoting inflow from the formation into the casing as well as from the casing into the pump tubing. The overall process is one wherein the sonic wave driving energy is converted to heat. A large amount of energy is involved, and the rate of transformation is high.

In FIG. 4 I have shown the lower end portion of the pump tubing surrounded by a cylindrical shell 50, having a top closure 51 connected as by welding, to the tubing 13, and forming at the bottom with an inwardly turned flange 52 also connected, as by welding, to tubing 13. This shell 50 may again be of a typical length of 20–30 feet. Contained within the shell 50 is a long annular inertia body or piston 53, whose inside diameter is such as to afford a loose sliding frictional fit on tubing 13, and whose outside diameter is such as to afford a thin annular fluid passage 54 between it and the shell 50. By reason of its inertia, this body tends to stand stationary during sonic oscillation of the pump tubing.

An abutment ring 55 is mounted in the upper end portion of shell 50, and a set of coil springs 56 are positioned between this ring 55 and the upper end of the piston 53, while a similar set of coil springs 57 is positioned between the lower end of piston 53 and the lower shell flange 52. The piston 53 is thus centered between the two sets of springs. The piston 53 is long and heavy, i.e., of large inertia. The springs 56 and 57 are selected to be sufficiently soft or of such low stiffness that the vibratory system consisting of the inertia piston 53 and the springs 56 and 57 has a lower resonant frequency than the frequency of oscillation of the tubing 13. It will be understood that the greater the mass of the member 53, and the less the stiffness of its centering springs, the lower will be the resonant oscillation frequency of the piston 53. With this understanding, the resonant oscillation frequency of the spring centered piston 53 is made substantially less than the oscillation frequency of the pump tubing. With such adjustment, the member 53 will stand substantially stationary in space while the tubing 13, the shell 30, and the spring support 52 and 55 oscillate vertically.

The space inside the shell 50 around the inertia piston 53 is filled with a suitable fluid such as oil. In the operation of the pump, the shell 50 oscillates vertically, while the inertia piston 53 stands substantially stationary, as described above, so that the abutment walls 52 and 55 alternately approach and recede from the respective ends of the inertia piston, while the surface of the tubing 13 slides on the mating surface of piston 53. This action pumps the contained oil alternately in opposite directions between the chambers 57 and 58 at opposite ends of the inertia piston through the restricted annular passage 54. The frictional resistance to this flow, and the consequent churning and turbulence, as well as the friction between the tubing 13 and the body 53, causes substantial conversion of the sonic wave energy driving the device to heat, and this heat elevates the temperature of the shell 50, with resulting heat transfer to the surrounding well fluids.

My invention can thus be conveniently applied to sonically driven pumps of the type disclosed in my original sonic pump patent mentioned heretofore, in which case sufficient sonic wave energy must be generated at the ground surface not only to operate the pump in its normal fashion, but also to supply the needs of the sonically energized heater. Alternatively, the present invention is broadly applicable to the use of a converter at the well bottom for converting sonic wave energy to heat, irrespective of the type of pump which may be used in the well.

Figure 7:
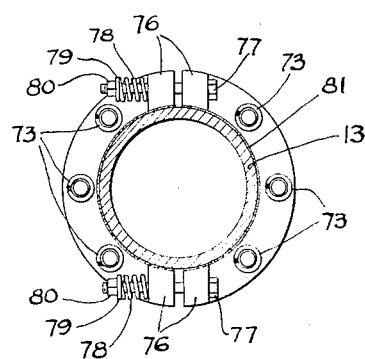
FIG. 7 is a transverse section on line 7—7 of FIG. 6.

In FIGS. 6 and 7 is shown a further embodiment of the invention, wherein sonic wave energy is converted to heat energy entirely by friction heating. The lower end portion of the sonic pump tubing 13 is in this case surrounded by a long annular inertia piston 70, whose inside surface has a friction sliding fit on the exterior wall surface of sonic pump tubing 13. Spring abutment shoulder rings 71 and 72 are secured, as by welding, to tubing 13 above and below member 70, and coil springs 73 are positioned between these rings and the opposed ends of member 70. The piston member 70 is thus centered between two sets of springs. As in the case of inertia piston 53 of FIG. 4, the springs 73 are selected to be sufficiently soft or of such low stiffness that the vibratory system consisting of the inertia piston 70 and the springs 73 has a lower resonant frequency than the frequency of oscillation of the sonic tubing 13. Thus, insofar as the spring system is concerned, the member 70 tends to stand stationary in space while the tubing 13 oscillates vertically.

The system of FIGS. 6 and 7 embodies, further, a unique means for increasing friction between member 70 and sonic tubing 13. For this purpose, the annular inertia piston 70 is split longitudinally into two semi-cylindric shoes 70a and 70b. At the ends of these semi-cylindric shoes 70a and 70b are pairs of opposed, perforated lugs, 76, through which pass headed bolts 77. Coil compression springs 78 are positioned on the protruding shanks of these bolts, and are compressed between the adjacent lugs 76 and washers 79 held in place by nuts 80. The shoes 70a and 70b are thereby spring-urged into frictional engagement with the surface of sonic tubing 13. The degree of spring pressure exerted, and therefore the extent of friction applied, may of course be adjusted by means of nuts 80. If desired, the interior surfaces of shoes 70a may be provided with a friction coating, for example, a layer 81 of material similar to brake lining. Such brake lining material affords good sliding friction, as well as avoiding wear between the shoes 70a and 70b and the sonic tubing. The wear of the lining itself is taken up by the springs 78.

In operation, because of the aforementioned low resonant frequency of the vibratory system comprised of the springs 73 and the inertia member 70, the latter tends to stand stationary during vertical oscillation of the pump tubing. However, because of the friction drag, the member 70 tends to oscillate somewhat, to an amplitude less than that of the sonic tubing 13, and with a definite phase lag. The member 70 has, by this frictional coupling, a component of in-phase motion with the sonic pipe. By this in-phase motion means a substantial amount of energy is transferred from the tubing 13 directly to member 70, thus not relying upon the springs 73 for any function here except as a centering means. A very effective converter of sonic energy to heat energy is thereby provided, capable of converting a large amount of sonic energy into heat energy, causing heating of surrounding well fluids both by heat conduction and radiation from the exterior surface of the shoes 70a and 70b.

This application is a continuation-in-part of my copending application, Serial No. 516,425, filed June 20, 1955, for Sonic Heater for Wells.

It will be understood that the drawings and description are merely illustrative of various forms which the invention may take in practice, and that various forms and embodiments beyond those specifically illustrated herein fall within the broad scope of the appended claims.

I claim:

1. The process of heating production well fluids within and surrounding a production well bore in a producing oil field, that comprises: generating sonic wave energy at the ground surface, transmitting said sonic wave energy down the well bore to a production region via a solid elastic wave transmitting column, and converting the sonic wave energy received at the lower end of said column to heat energy by oscillating a member coupled to said lower end of said column relative to a heat generating body, while holding said body in frictional contact therewith.

2. The process of heating production well fluids within and surrounding a production well bore in a producing oil field, that comprises: generating sonic wave energy at the ground surface, transmitting said sonic wave energy down the well bore to a production region via a solid elastic wave transmitting column, and converting the sonic wave energy received at the lower end of said column to heat energy by oscillating a member coupled to said lower end of said column relative to a localized body of liquid, while holding said body of liquid in the lower portion of the well bore in frictional contact with said oscillating member.

3. In a production oil well in a producing oil field, in combination: a sonic wave generator at the ground surface, an elastic column of solid material in the well extending downwardly therein to an oil production zone, said column being drivingly coupled at its upper end to said sonic wave generator for receiving sonic wave impulses therefrom and for transmitting corresponding sonic waves down the well bore to said production zone, and a converter of sonic wave energy to heat energy on the lower end of said column including a surface which oscillates in response to sonic waves transmitted down said column, and an inertia body maintained in localized frictional contact with said oscillating surface and restrained by its inertia against oscillatory movement therewith, whereby said surface oscillates relatively to said body and sonic energy is converted to heat by frictional dissipation.

4. The subject matter of claim 3, wherein said inertia body constitutes a body of liquid.

5. The subject matter of claim 3, wherein said inertia body comprises a solid mass.

6. In a production oil well in a producing oil field, in combination: a sonic wave generator at the ground surface, an elastic column of solid material in the well extending downwardly therein to an oil production zone, said column being drivingly coupled at its upper end to said sonic wave generator for receiving sonic wave impulses therefrom and for transmitting corresponding sonic waves down the well bore to said production zone, and a converter of sonic wave energy to heat energy on the lower end of said column including a means which oscillates in response to sonic waves transmitted down said column and which has an oscillatory surface extended in the direction of oscillation, a solid body in frictional contact with said oscillating surface, and spring means connecting said body to said oscillatory means, the mass of said body and the elastic stiffness of said spring means being such that the resonant frequency of the combination of body and spring means is less than the frequency of said sonic waves, whereby said body tends to stand stationary in space relative to said oscillatory means.

7. In a sonic well heating apparatus the combination of: a converter for transmitting sonic wave energy to heat energy comprising, a shell means adapted to be situated in a well bore and to surround a localized body of liquid to be heated, and agitator means in said shell means in frictional contact with said body of liquid, at least one of said means being oscillatory with respect to said body of liquid; and means for effecting oscillation of said oscillatory means comprising a sonic wave generator at the ground surface, and a solid, elastically oscillatory column means in said well bore drivingly coupled at its upper end to said generator and at its lower end to said oscillatory means of said converter, said oscillatory column means transmitting sonic waves of elastic deformation down the well bore whereby its lower end portion and said oscillatory means of said converter undergo sonic oscillatory motion relative to said body of liquid.

8. The subject matter of claim 7, wherein said shell means includes a liquid passage affording communication between said localized body of liquid and external well liquid.

9. In sonic well heating apparatus, the combination of: a converter for transmitting sonic wave energy to heat energy comprising a shell adapted to be situated in a well bore, and to surround a localized body of liquid to be heated, and an agitator means in said shell forming a restricted passage for liquid of said body through which said liquid is induced to flow by virtue of sonic oscillatory motion of said shell; and means for effecting sonic oscillation of said shell comprising a sonic wave generator at the ground surface, and a solid, elastically oscillatory column means in said well bore drivingly coupled at its upper end to said generator and at its lower end to said shell, said oscillatory column means transmitting sonic waves of elastic deformation down the well bore whereby its lower end portion and said shell undergo oscillatory motion.

10. The subject matter of claim 9, wherein said agitator means comprises means fixed to said shell defining a restricted passageway for said liquid.

11. The subject matter of claim 10, wherein said shell includes a liquid passage affording communication between said body of liquid and external well liquid.

12. The subject matter of claim 9, wherein said agitator means comprises means fixed to said shell defining a plurality of tortuous passages for said liquid extending generally in the direction of oscillation of said shell.

13. The subject matter of claim 9, wherein said shell is elongated vertically, said agitator means comprises a plurality of perforated baffle plates in and spaced along said shell, and said shell includes openings at its upper and lower ends through which said liquid body is in communication with external well liquid.

14. The subject matter of claim 9, wherein said shell is coupled to said column means for oscillation thereby, and said agitator means comprises a solid inertia body in said shell forming a restricted liquid passage between upper and lower ends of said shell, and spring means connecting said body to said shell for relative vertical oscillation of said shell with respect to said body, said body and said spring means having such mass and stiffness constants that the resonant frequency thereof is lower than the sonic frequency of said generator, whereby said body tends to stand stationary in place during oscillation of said shell.

15. Sonic pumping and well heating apparatus comprising, in combination: a sonic well pump, including a pump column of solid, elastic material in the well bore, and a sonic wave generator at the ground surface for sending oscillatory sonic deformation waves down said pump column; and a converter of sonic energy to heat on the lower end of said column embodying a fluid containing shell having fluid agitation means therein operable by virtue of oscillation of the lower end of said column to transform said sonic wave energy into heat energy by frictional dissipation.

16. Sonic pumping and well heating apparatus comprising, in combination: a sonic well pump, including a pump column of solid, elastic material in the well bore, and a sonic wave generator at the ground surface for sending oscillatory sonic deformation waves down said column, and a converter of sonic energy to heat on the lower end of said column embodying a fluid containing shell in fluid communication with the well fluids and having fluid agitation means therein operable by virtue of oscillation of the lower end of said column to transform said sonic wave energy into heat energy by friction dissipation.

17. The method of increasing the production rate of a producing oil well by heating the production liquid in the producing region of the earthen formation of said well which comprises: generating sustained elastic vibration waves in a sonic pump column of elastic material disposed longitudinally in said well and extending down to the producing region, transmitting said elastic vibration waves to one of two bodies located in said producing region so as to generate sustained relative cyclic motion between said two bodies, maintaining said two bodies in effective dragging contact with each other so that the heat of friction will build up in said two bodies to a temperature substantially above the normal temperature of said petroleum flowing from said producing formation, all in such manner that effective heat is caused to flow back by temperature gradient from said two bodies, counter to the flow of and into the incoming petroleum, so as to heat said petroleum in said formation, thus reducing the viscosity of said petroleum to increase the production rate thereof, and producing said petroleum from said well with said sonic pump.

18. In a production oil well in a producing oil field, in combination: a sonic well pump, including a pump column of solid, elastic material in the well bore, reaching to an oil production zone, and a sonic wave generator at the ground surface for sending oscillatory sonic deformation waves down said pump column; and a converter of sonic energy to heat on the lower end of said column embodying a free inertia body slidable on the lower end portion of said sonic pump tubing and having a frictional drag coupling therewith, so as to have a component of in-phase motion therewith, so as to transform sonic wave energy transmitted down said sonic pump tubing into heat energy by frictional dissipation.

References Cited in the file of this patent

UNITED STATES PATENTS

| 2,350,212 | Bodine | May 30, 1944 |
| 2,667,932 | Bodine | Feb. 2, 1954 |
| 2,680,485 | Bodine | June 8, 1954 |